(12) United States Patent
Kikuchi et al.

(10) Patent No.: US 11,561,350 B2
(45) Date of Patent: Jan. 24, 2023

(54) OPTICAL MODULE

(71) Applicant: Nippon Telegraph and Telephone Corporation, Tokyo (JP)

(72) Inventors: Kiyofumi Kikuchi, Musashino (JP); Shunichi Soma, Musashino (JP); Ken Tsuzuki, Musashino (JP); Shuichiro Asakawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 147 days.

(21) Appl. No.: 17/043,529

(22) PCT Filed: Mar. 25, 2019

(86) PCT No.: PCT/JP2019/012356
§ 371 (c)(1),
(2) Date: Sep. 29, 2020

(87) PCT Pub. No.: WO2019/208055
PCT Pub. Date: Oct. 31, 2019

(65) Prior Publication Data
US 2021/0364711 A1  Nov. 25, 2021

(30) Foreign Application Priority Data
Apr. 26, 2018 (JP) .............................. JP2018-085713

(51) Int. Cl.
*G02B 6/42* (2006.01)
(52) U.S. Cl.
CPC ......... *G02B 6/4219* (2013.01); *G02B 6/4268* (2013.01)

(58) Field of Classification Search
None
See application file for complete search history.

(56) References Cited

U.S. PATENT DOCUMENTS 7,835,069 B2 * 11/2010 Hamada .............. H01S 3/13017
359/337
10,025,047 B1 * 7/2018 Liu .......................... H05K 1/11
(Continued)

FOREIGN PATENT DOCUMENTS

JP   2004-287184 A   10/2004
WO  2017/138468 A1   2/2017

OTHER PUBLICATIONS

International Search Report dated Jun. 4, 2019, issued in PCT Application No. PCT/JP2019/012356, filed Mar. 25, 2019.
(Continued)

*Primary Examiner* — Jerry Rahll
(74) *Attorney, Agent, or Firm* — Workman Nydegger (57) ABSTRACT

To reduce bad connections of a BGA optical module as an optical fiber interface during mounting by reflowing. An optical module includes: a substrate to which an optical fiber is connected and fixed and on which an electronic circuit, an optical circuit or the like is formed; a ball grid array provided on one face of the substrate as an electrical interface used when the optical module is mounted on a mounting substrate; a lid having a thermal conductivity provided on another face of the substrate; and a fiber routing mechanism provided in contact with the lid, the fiber routing mechanism having a thermal conductivity and shaped to enable the optical fiber to be wound around the fiber routing mechanism.

11 Claims, 4 Drawing Sheets

(56) References Cited

U.S. PATENT DOCUMENTS

| | | | | |
|---|---|---|---|---|
| 10,845,562 B2* | 11/2020 | Kohn | .................... | G02B 6/4457 |
| 10,921,534 B2* | 2/2021 | Dong | ....................... | G02B 6/42 |
| 10,928,593 B2* | 2/2021 | Novack | ................ | G02B 6/4285 |
| 2008/0239468 A1* | 10/2008 | Hamada | .............. | H01S 3/13017 |
| | | | | 359/333 |
| 2009/0310921 A1* | 12/2009 | Kurita | .................. | G02B 6/4239 |
| | | | | 385/88 |
| 2016/0124164 A1* | 5/2016 | Doerr | .................... | G02B 6/4272 |
| | | | | 385/14 |
| 2020/0064578 A1* | 2/2020 | Kohn | .................... | G02B 6/4457 |
| 2020/0110223 A1* | 4/2020 | Novack | ................ | G02B 6/4285 |

OTHER PUBLICATIONS

H. Tanobe et al., *Compact 100 GB/s DP-QPSK Integrated Receiver Module Employing Three-Dimensional Assembly Technology*, Optics Express, vol. 22, No. 5, Mar. 10, 2014, pp. 6108-6113.

* cited by examiner

Fig. 8 ical signal. In particular, it relates to an optical
OPTICAL MODULE

TECHNICAL FIELD

The present invention relates to an optical module that transmits and processes a high-frequency electrmodule that has a fiber routing structure having a heat radiation function.

BACKGROUND ART

Against a background of rapid growth of the demand for telecommunications, active investigations are being carried out to increase the capacity of communication networks. As for optical modules, there is an intense demand for downsizing that allows improvement of the bitrate per unit volume and reduction of the power consumption of communication facilities. Ball grid array (BGA), which is an example of external electrodes, is a key technology for achieving the downsizing of optical modules through downsizing of electrical interfaces. BGA packages are mounted on substrates by reflowing and therefore are expected to lead to a reduction of the packaging cost (See Non-Patent Literature 1).

CITATION LIST

Non-Patent Literature

Non-Patent Literature 1: H. Tanobe, Y. Kurata, Y. Nakanishi, H. Fukuyama, M. Itoh, and E. Yoshida, "Compact 100 Gb/s DP-QPSK integrated receiver module employing three-dimensional assembly technology," OPTICS EXPRESS 22(5), pp. 6108-6113 (2014)

SUMMARY OF THE INVENTION

Technical Problem

Figure 1:
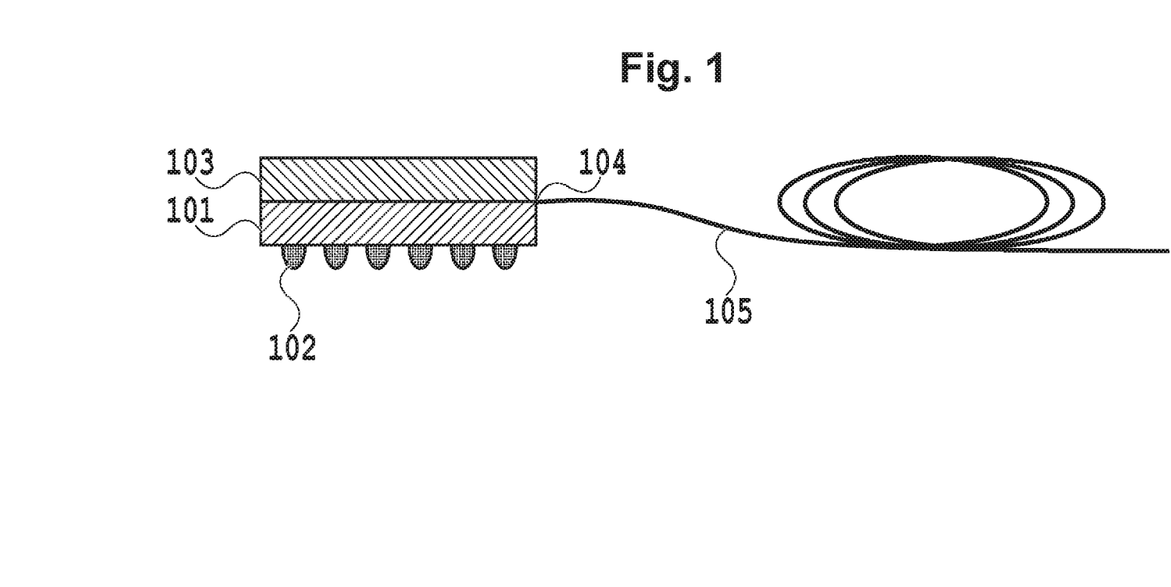
FIG. 1 is a diagram showing a conventional optical module.

Unlike electronic devices, however, many communication optical modules use an optical fiber as an optical interface, and there is a problem that the BGA package can be inclined under the weight of the optical fiber during reflowing to cause a bad connection of a BGA ball. FIG. 1 schematically shows a conventional optical module. The optical module shown in FIG. 1 includes a substrate 101 on which a chip component is mounted, a BGA 102 provided on one face of the substrate 101, a lid 103 connected to another face of the substrate 101 that is opposite to the face on which the BGA 102 is provided, an optical fiber drawing part 104 between the substrate 101 and the lid 103, and an optical fiber 105 drawn from the optical fiber drawing part. If the optical module shown in FIG. 1 is mounted on a mounting substrate (not shown) in a reflow step, the BGA package, which would otherwise be mounted in such a manner that the substrate 101 is in parallel with the mounting substrate to ensure the electrical connection therebetween, can be inclined under the weight of the optical fiber to cause a bad connection.

The present invention has been devised in view of the prior art described above, and an object of the present invention is to provide a BGA optical module that has a fiber routing mechanism and therefore can be mounted by reflowing.

Means for Solving the Problem

To attain the object described above, an optical module according to an aspect of the present invention is an optical module including:
  a ball grid array provided on a face of a substrate;
  a lid having a thermal conductivity connected to another face of the substrate;
  a fiber routing mechanism having a thermal conductivity thermally connected to a face of the lid that is opposite to a face of the lid in contact with the substrate;
  an optical fiber drawing part between the substrate and the lid; and
  at least one optical fiber drawn from the optical fiber drawing part,
  wherein the fiber routing mechanism is a mechanism around which the optical fiber can be wound.

According to another aspect of the optical module, the fiber routing mechanism is provided with a part made of a heat insulating material.

According to another aspect of the optical module, the fiber routing mechanism and the lid form an integral structure.

According to another aspect of the optical module, the fiber routing mechanism has a protrusion part, and the protrusion part is arranged to cover the optical fiber drawing part between the substrate and the lid.

According to another aspect of the optical module, an optical component is connected to a part of the optical fiber, and the optical component is located on the fiber routing mechanism.

According to another aspect of the optical module, a fiber block protrudes from the optical fiber drawing part.

According to another aspect of the optical module, the fiber routing mechanism covers the optical fiber.

According to another aspect of the optical module, a heat insulator provided on an inner face of the fiber routing mechanism covers the optical fiber without a gap.

Effects of the Invention

The present invention advantageously reduces the rate of bad connections of a BGA optical module as an optical fiber interface during mounting by reflowing.

DESCRIPTION OF EMBODIMENTS

In the following, embodiments of the present invention will be described with reference to the drawings. In the drawings, components having the same functions are denoted by the same reference numerals for the sake of clarity of illustration. However, it will be obvious to those skilled in the art that the present invention is not limited to the embodiments specifically described below, and various modifications to the configurations or other details without departing from the spirit of the present invention disclosed in this specification and the like. Components in different embodiments can be combined as required.

First Embodiment

Figure 2:
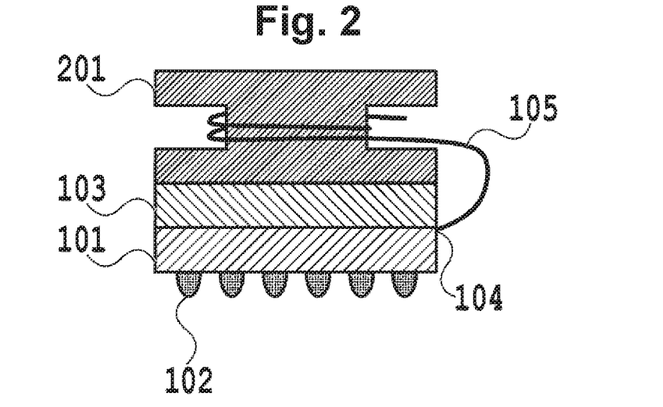
FIG. 2 is a diagram showing a first embodiment of the present invention.

FIG. 2 is a side view of an optical module according to a first embodiment of the present invention. The optical module according to the first embodiment of the present invention includes:

a substrate 101 on which a chip component is mounted;
a BGA 102 provided on one face of the substrate 101;
a lid 103 connected to another face of the substrate 101 that is opposite to the face on which the BGA 102 is provided;
a fiber routing mechanism 201 having a thermal conductivity that is thermally connected to a face of the lid 103 that is opposite to the face connected to the substrate 101;
an optical fiber drawing part 104 between the substrate 101 and the lid 103; and
an optical fiber 105 drawn from the optical fiber drawing part.

The fiber routing mechanism 201 has recesses along opposite edges thereof. That is, the fiber routing mechanism 201 has a thinner part around the geometric center thereof. The thinner part, which is a part around which an optical fiber is to be wound, is referred to as a middle part of the fiber routing mechanism 201, the part of the fiber routing mechanism 201 above the middle part is referred to as an upper part, and the part of the fiber routing mechanism 201 below the middle part is referred to as a lower art. The shape of the cross section of the middle part in top view may be a shape having a radius of curvature, such as a circle or an ellipse, or an n-gon (n denotes an integer equal to or greater than 3), such as a polygon or a rectangle. If n=4, the fiber routing mechanism is easy to process. If n=6 to 8, an optical fiber wound around the fiber routing mechanism can be prevented from substantially remaining bent after being removed therefrom.

By winding the optical fiber 105 around the fiber routing mechanism 201 as shown in FIG. 2, the center of gravity of the optical module is stabilized, and the optical module is less likely to be inclined when the optical module is mounted by reflowing. In this way, the optical module according to the first embodiment of the present invention can advantageously reduce the rate of bad connections during mounting by reflowing.

Although FIG. 2 shows a single optical fiber, a plurality of optical fibers is used in many cases. For example, three optical fibers may be used.

Although FIG. 2 shows an example in which two turns of the optical fiber 105 are wound around the recessed middle part of the fiber routing mechanism 201, the number of turns of the optical fiber 105 can range from 2 to 100. For example, the number of turns of the optical fiber 105 may be 10.

With the optical module according to the first embodiment of the present invention, the substrate 101 is made of ceramics because ceramics has excellent high-frequency characteristics. However, the optical module according to the present invention is not limited to the material, and a resin material added with glass or a simple resin material can also be used, for example.

The lid 103 and the fiber routing mechanism 201 are made of aluminum because aluminum has high thermal conductivity and inexpensive. However, the optical module according to this embodiment is not limited to the material, and other metals, such as copper or copper tungsten, or other materials can also be used.

In the above description, the optical fiber drawing part 104 is provided between the substrate 101 and the lid 103, in order to minimize material processing. However, the optical module according to the present invention is not limited to the arrangement. For example, an optical fiber may be drawn through a hole formed in the lid, a hermetically sealed lens-coupled system may be used, or an optical fiber boot or the like may be used.

Second Embodiment

Figure 3:
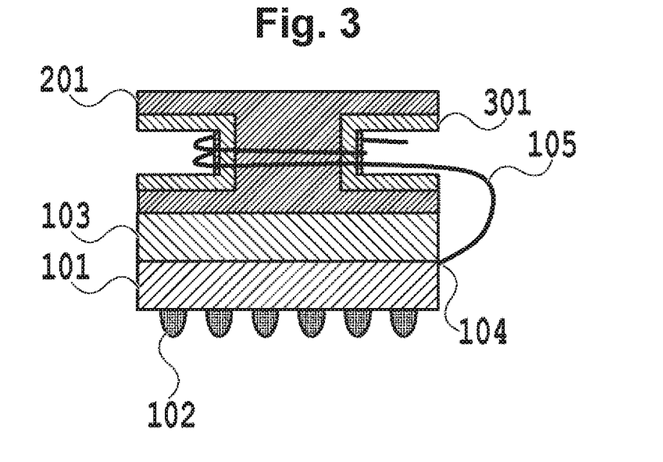
FIG. 3 is a diagram showing a second embodiment of the present invention.

FIG. 3 shows a configuration of an optical module according to a second embodiment of the present invention. The optical module according to the second embodiment of the present invention is basically the same as the optical module according to the first embodiment except that the fiber routing mechanism 201 is provided with a heat insulator 301 on the middle part, around which the optical module 105 is wound, on a lower face of the upper part and an upper face of the lower part. This arrangement can advantageously protect the optical fiber from the heat in the reflow step for mounting the optical module on the substrate while reducing the rate of bad connections of the BGA optical module as an optical fiber interface during mounting by reflowing.

With the optical module according to the second embodiment of the present invention, the material of the heat insulator 301 is polyether ether ketone (PEEK) resin because PEEK resin has excellent heat insulation properties. However, the optical module according to the present invention is not limited to the material, and other resins, such as polyimide, or other heat insulating materials can also be used.

Although FIG. 3 shows a single optical fiber, a plurality of optical fibers is used in many cases. For example, three optical fibers may be used.

Although an example is shown in which two turns of the optical fiber 105 are wound around the recessed middle part of the fiber routing mechanism 201 provided with the heat insulator on the outside thereof, the number of turns of the optical fiber 105 can range from 2 to 100.

Third Embodiment

Figure 4:
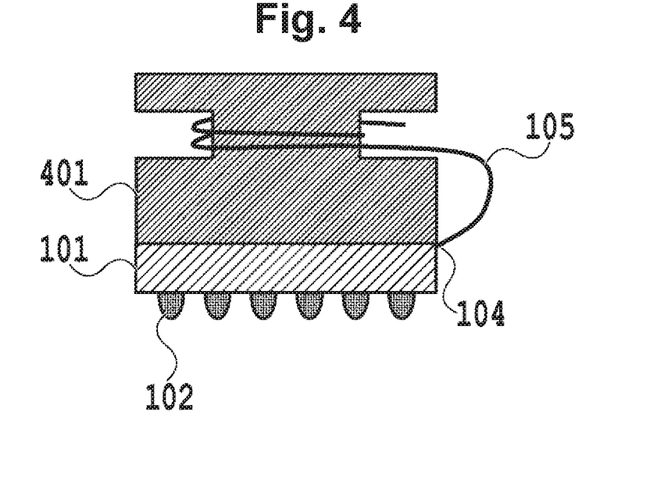
FIG. 4 is a diagram showing a third embodiment of the present invention.

FIG. 4 shows a configuration of an optical module according to a third embodiment of the present invention. In the optical module according to the third embodiment of the present invention, the lid and the fiber routing mechanism are provided as an integral structure. The integral structure is the difference from the optical module according to the first embodiment. This arrangement can advantageously reduce the thermal resistance of a fiber routing mechanism 401 provided with a lid and reduce the rate of bad connections of the BGA optical module as an optical fiber interface during mounting by reflowing while ensuring higher thermal conductivity.

Although FIG. 4 shows a single optical fiber, a plurality of optical fibers is used in many cases. For example, three optical fibers may be used.

Although an example is shown in which two turns of the optical fiber 105 are wound around the recessed middle part of the fiber routing mechanism 401 the number of turns of the optical fiber 105 can range from 2 to 100.

Fourth Embodiment

Figure 5:
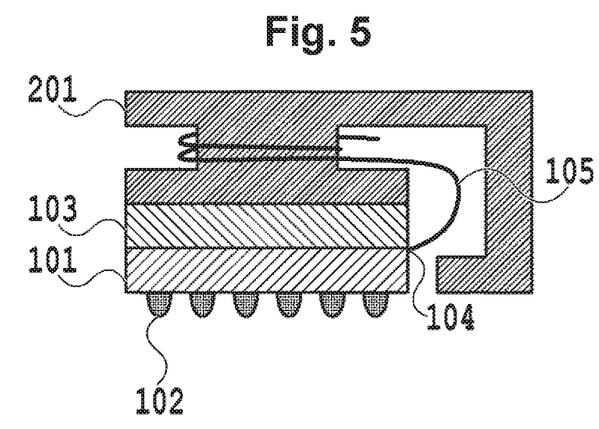
FIG. 5 is a diagram showing a fourth embodiment of the present invention.

FIG. 5 shows a configuration of an optical module according to a fourth embodiment of the present invention. The optical module according to the fourth embodiment of the present invention is characterized in that the fiber routing mechanism 201 has a protrusion part (referred to also as an extension part) that protrudes to cover the optical fiber drawing part 104. The optical module according to the fourth embodiment differs from the optical module according to the first embodiment in that the fiber routing mechanism 201 has the protrusion part. The optical fiber 105 drawn from the optical fiber drawing part 104 is partially surrounded by an end face of the lid 103 and an inner face of the protrusion part of the fiber routing mechanism 201. An end face (the end face on the right side) of the substrate 101 and an end face of the protrusion part of the fiber routing mechanism 201 are opposed to each other.

Although FIG. 5 shows a single optical fiber, a plurality of optical fibers is used in many cases. For example, three optical fibers may be used.

In the drawing, two turns of the optical fiber are wound around the recessed middle part of the fiber routing mechanism 201. However, the number of turns of the optical fiber 105 can range from 2 to 100.

This arrangement can advantageously protect the entire optical fiber 105 from the heat for reflowing while reducing the rate of bad connections of the BGA optical module as an optical fiber interface during mounting by reflowing.

Although the fiber routing mechanism 201 according to this embodiment has an asymmetric structure with the protrusion part provided on the right side, the fiber routing mechanism can also have a symmetric structure further including a protrusion part on the left side. If the fiber routing mechanism has such a symmetric structure, the structural center of the optical module coincides with the center of gravity thereof. Therefore, the optical module having the fiber routing mechanism having the symmetric structure is advantageously less likely to be inclined during reflowing.

Fifth Embodiment

Figure 6:
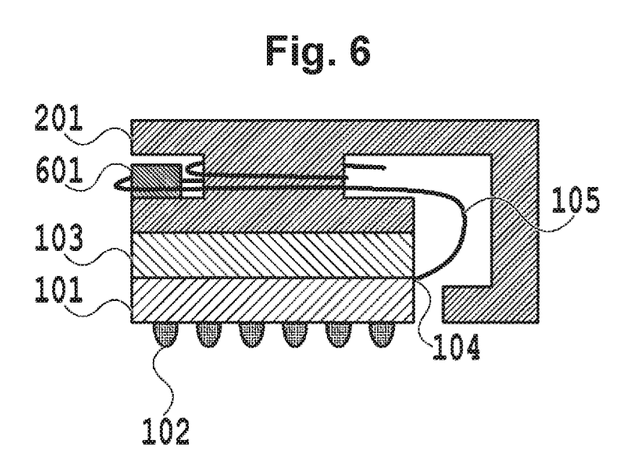
FIG. 6 is a diagram showing a fifth embodiment of the present invention.

FIG. 6 shows a configuration of an optical module according to a fifth embodiment of the present invention. The optical module according to the fifth embodiment of the present invention is characterized in that the optical fiber 105 is provided with an optical component 601 at a part thereof, and the optical component 601 is located on the fiber routing mechanism 201.

The optical module according to the fifth embodiment of the present invention includes a mode field converter as the optical component 601. The optical module according to the fifth embodiment differs from the optical module according to the fourth embodiment in that the optical component 601 is located on the lower part of the fiber routing mechanism 201. The optical fiber 105 drawn from the optical fiber drawing part 104 is partially surrounded by an end face of the lid 103 and an inner face of the protrusion part of the fiber routing mechanism 201. An end face (the end face on the right side) of the substrate 101 and an end face of the protrusion part of the fiber routing mechanism 201 are opposed to each other.

Although FIG. 6 shows a single optical fiber, a plurality of optical fibers is used in many cases. For example, three optical fibers may be used.

In FIG. 6, two turns of the optical fiber 105 are wound around the recessed, thinner middle part of the fiber routing mechanism 201. However, the number of turns of the optical fiber 105 on the middle part can range from 2 to 100.

This arrangement can advantageously have additional optical function while reducing the rate of bad connections of the BGA optical module as an optical fiber interface during mounting by reflowing.

Although the mode field converter is mounted as the optical component 601 in the above description, other optical components, such as a variable attenuator, an optical fiber amplifier, a tap monitor, a polarization multiplexer/demultiplexer, can also be used.

Although the fiber routing mechanism 201 according to this embodiment has an asymmetric structure with the protrusion part provided on the right side and the optical component 601 provided on the left side on the middle part, the fiber routing mechanism can also have a symmetric structure further including a protrusion part on the left side and an object made of the same material and having the same shape as the optical component 601 provided on the right side on the middle part. If the fiber routing mechanism has such a symmetric structure, the structural center of the optical module coincides with the center of gravity thereof. Therefore, the optical module having the fiber routing mechanism having the symmetric structure is advantageously less likely to be inclined during reflowing.

Sixth Embodiment

Figure 7:
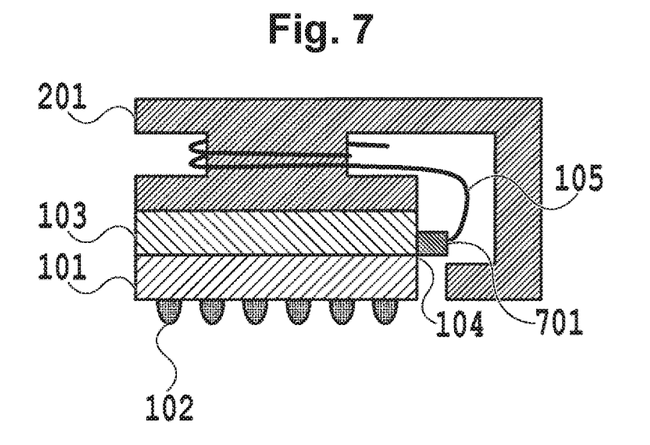
FIG. 7 is a diagram showing a sixth embodiment of the present invention.

FIG. 7 shows a configuration of an optical module according to a sixth embodiment of the present invention. The optical module according to the sixth embodiment of the present invention is characterized in that a fiber block 701 protrudes from the optical fiber drawing part 104. The optical module according to the sixth embodiment differs from the optical module according to the fifth embodiment in that the fiber block 701 protrudes from the optical fiber drawing part 104. The fiber block 701 is provided on an end face (the end face on the right side) of the lid 103, and a part of the fiber block 701 lies on an edge part of the optical fiber drawing part 104. Since the fiber block, which would otherwise be mounted on the substrate 101, protrudes out of the substrate, the upper face (or the surface area of the lower face) of the substrate 101 can be reduced.

Although FIG. 7 shows a single optical fiber, a plurality of optical fibers is used in many cases. For example, three optical fibers may be used.

In FIG. 7, two turns of the optical fiber 105 are wound around the recessed, thinner middle part of the fiber routing mechanism 201. However, the number of turns of the optical fiber 105 can range from 2 to 100. For example, the number of turns of the optical fiber 105 may be 10.

This arrangement can advantageously reduce the rate of bad connections of the BGA optical module as an optical fiber interface during mounting by reflowing.

Although the fiber routing mechanism 201 according to this embodiment has an asymmetric structure with the protrusion part provided on the right side and the fiber block 701 provided on the right side on the lid 103, the fiber routing mechanism can also have a symmetric structure further including a protrusion part on the left side and an object made of the same material and having the same shape as the fiber block 701 provided on the left side on the lid 103. If the fiber routing mechanism has such a symmetric structure, the structural center of the optical module coincides with the center of gravity thereof. Therefore, the optical module having the fiber routing mechanism having the symmetric structure is advantageously less likely to be inclined during reflowing.

Seventh Embodiment

Figure 8:
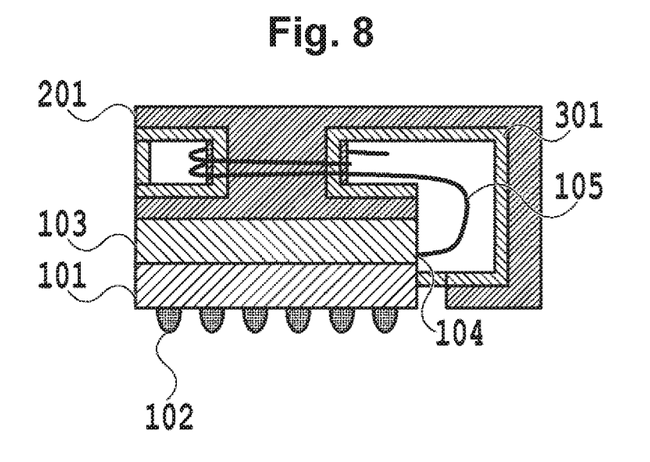
FIG. 8 is a diagram showing a seventh embodiment of the present invention.

FIG. 8 shows a configuration of an optical module according to a seventh embodiment of the present invention. The optical module according to the seventh embodiment of the present invention is characterized in that a heat insulator 301 is provided on an inner face of the protrusion part of the fiber routing mechanism 201 so that the optical fiber 105 is completely covered by the heat insulator 301 without any gap.

The substrate 101, the BGA 102, the lid 103, the fiber routing mechanism 201 and the optical fiber are prepared, and the heat insulator is provided on an upper face of the lower part, opposite side faces of the middle part, a lower face of the upper part and an inner face of the protrusion part of the fiber routing mechanism 201. After that, the optical fiber 105 is wound around the heat insulator provided on the opposite side faces of the middle part of the fiber routing mechanism 201. After that, the heat insulator is provided between the left edge of the upper face of the lower part and the left edge of the lower face of the upper part of the fiber routing mechanism 201 and between the right edge face of the substrate 101 and the edge face of the heat insulator provided on the inner face of the protrusion part, thereby completing the structure shown in FIG. 8 in which the heat insulator 301 completely covers the optical fiber 105 without any gap.

Although FIG. 8 shows a single optical fiber, a plurality of optical fibers is used in many cases. For example, three optical fibers may be used.

Although an example is shown in which two turns of a single optical fiber 105 are wound around the recessed middle part of the fiber routing mechanism 201 provided with the heat insulator on the outside thereof, the number of turns of the optical fiber 105 can range from 2 to 100.

This arrangement can advantageously protect the optical fiber from the heat for reflowing while reducing the rate of bad connections of the BGA module as an optical fiber interface during mounting by reflowing.

With the optical module according to the seventh embodiment, the optical fiber is covered by the heat insulator 301 in order to improve the heat insulation properties. However, the optical module according to the present invention is not limited to this example, and the optical fiber can also be covered by a fiber routing mechanism made of aluminum, for example.

Although the fiber routing mechanism 201 according to this embodiment has an asymmetric structure with the protrusion part provided on the right side and the heat insulator 301 provided on the inner side of the fiber routing mechanism 201, the fiber routing mechanism can also have a symmetric structure further including a protrusion part on the left side and an object made of the same material and having the same shape as the heat insulator 301 provided on the inner side of the protrusion part on left side. If the fiber routing mechanism has such a symmetric structure, the structural center of the optical module coincides with the center of gravity thereof. Therefore, the optical module having the fiber routing mechanism having the symmetric structure is advantageously less likely to be inclined during reflowing.

INDUSTRIAL APPLICABILITY

The present invention can be applied to an optical module that transmits and processes a high-frequency electrical signal and an optical signal.

REFERENCE SIGNS LIST

101 Substrate
102 BGA
103 Lid
104 Optical fiber drawing part
105 Optical fiber
201 Fiber routing mechanism
301 Heat insulator
401 Fiber routing mechanism with lid
601 Optical component

The invention claimed is:

1. An optical module, comprising:
   a ball grid array provided on a face of a substrate;
   a lid having a thermal conductivity connected to another face of the substrate;
   a fiber routing mechanism having a thermal conductivity connected to a face of the lid that is opposite to a face of the lid in contact with the substrate;
   an optical fiber drawing part between the substrate and the lid; and
   at least one optical fiber drawn from the optical fiber drawing part,
   wherein the fiber routing mechanism is a mechanism around which the optical fiber can be wound, and
   wherein a portion of the fiber routing mechanism where the optical fiber is wound is provided with a heat insulating material that is a different material than the material of the fiber routing mechanism.

2. The optical module according to claim 1, wherein the fiber routing mechanism covers the optical fiber.

3. The optical module according to claim 1, wherein the fiber routing mechanism and the lid form an integral structure.

4. The optical module according to claim 3, wherein an optical component is connected to a part of the optical fiber, and the optical component is located on the fiber routing mechanism.

5. The optical module according to claim 3, wherein the fiber routing mechanism has a protrusion part, and the protrusion part is arranged to cover the optical fiber drawing part between the substrate and the lid.

6. The optical module according to claim 1, wherein the heat insulating material is provided on an inner face of the fiber routing mechanism and covers the optical fiber without a gap.

7. The optical module according to claim 1, wherein the fiber routing mechanism has a protrusion part, and the protrusion part is arranged to cover the optical fiber drawing part between the substrate and the lid.

8. The optical module according to claim 7, wherein a fiber block protrudes from the optical fiber drawing part.

9. The optical module according to claim 7, wherein an optical component is connected to a part of the optical fiber, and the optical component is located on the fiber routing mechanism.

10. The optical module according to claim 1, wherein an optical component is connected to a part of the optical fiber, and the optical component is located on the fiber routing mechanism.

11. The optical module according to claim 10, wherein a fiber block protrudes from the optical fiber drawing part.

\* \* \* \* \*